J. T. Hammitt,

Desk.

Nº 8,486.   Patented Nov. 4, 1851.

UNITED STATES PATENT OFFICE.

JOHN T. HAMMITT, OF PHILADELPHIA, PENNSYLVANIA.

DESK.

Specification of Letters Patent No. 8,486, dated November 4, 1851.

*To all whom it may concern:*

Be it known that I, JOHN T. HAMMITT, of the city and county of Philadelphia and State of Pennsylvania, have invented a new and useful Improvement in Elevating Desks and Tables; and I hereby declare that the following is a full and exact description thereof.

Figure 1:
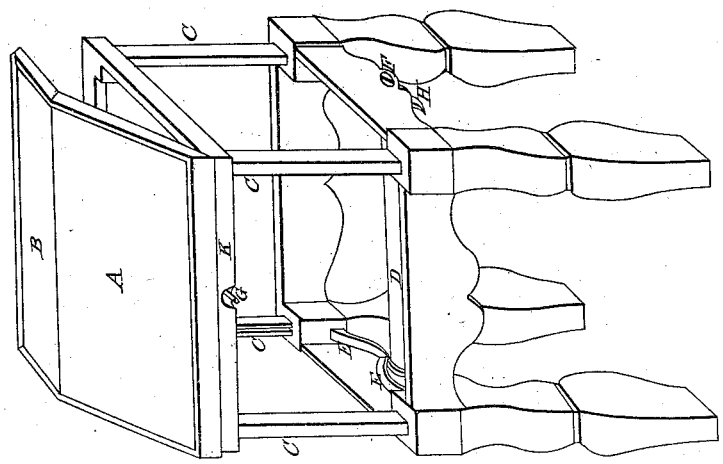

In the accompanying drawings which form a part of this specification Figure 1 is a perspective view elevated for the person using to stand up; A, front part of the top; B, back part of the top; C, slides connected to the frame upon which the top rests which slides pass down into the legs; D, roller; E, straps one end of which are fastened to the slides C and the other ends to roller D; F, end of roller D to which I apply a crank for the purpose of raising or lowering the top; H, pawl which catches in a ratchet on the roller D for the purpose of holding the top in the desired position.

Figure 2:
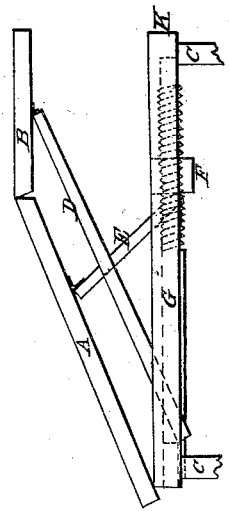

Fig. 2, end section showing the manner of elevating the top; A, front part of the top; B, back part of the top; C, slides; D, levers connecting nut F and front part of top A; G, screw.

Figure 3:
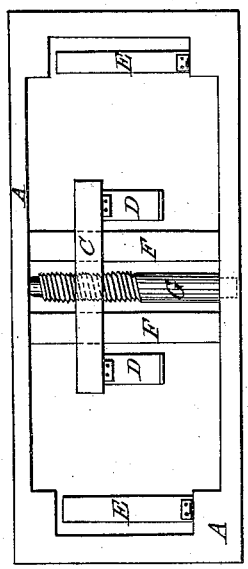

Fig. 3, horizontal section; A, elevating frame to which the top is attached; G, screw; C, nut on screw G and guides F; D, levers attached to nut C and the front part of the top; E, levers attached to elevating frame and the back part of the top of the desk; F, guides upon which nut C slides.

When I wish to sit down to my desk I place a crank on the end of roller D at F, throw the pawl H out of the ratchet, and turn the crank backward, which unwinds the straps E; and when I wish to use it as a table I place the crank on screw G and turn it backward until the top is brought down on the elevating frame.

Having thus fully described the construction and operation of my elevating desk, what I claim as new and of my invention, and desire to secure by Letters Patent, is—

The raising of a horizontal surface at the back part of the desk or table when the front part is being raised to form an inclined plane by means of the arrangement of the screw and lever or any analogous device the front part being hinged to the elevating frame K the same to be applied to standing or sitting desks, or tables, substantially in the manner and for the purpose set forth.

JOHN T. HAMMITT.

Witnesses:
WM. BULLOCH,
I. R. MURPHY.